No. 681,433.  
A. L. BARON.  
FILTER.  
(Application filed Dec. 31, 1900.)  
Patented Aug. 27, 1901.

(No Model.)

WITNESSES:

INVENTOR
Albert L. Baron
BY
ATTORNEY

UNITED STATES PATENT OFFICE.

ALBERT L. BARON, OF BROOKLYN, NEW YORK.

FILTER.

SPECIFICATION forming part of Letters Patent No. 681,433, dated August 27, 1901.

Application filed December 31, 1900. Serial No. 41,752. (No model.)

*To all whom it may concern:*

Be it known that I, ALBERT L. BARON, a citizen of the United States, and a resident of the city of New York, borough of Brooklyn, in the county of Kings and State of New York, have invented certain new and useful Improvements in Filters, which improvements are fully set forth in the following specification, reference being had to the accompanying drawings.

My invention relates to filters, and particularly to water-filters which are adapted to be adjusted in position upon a faucet.

The objects of my invention are to provide a filter which can readily and easily be taken apart for the purpose of cleaning the filtering material, to provide a large and effective filtering-surface relatively to the size of the filter as a whole, and to provide means whereby the filtering material will not readily become clogged.

I will now proceed to describe a filter embodying my invention and will then point out the novel features in a claim.

Figure 1:
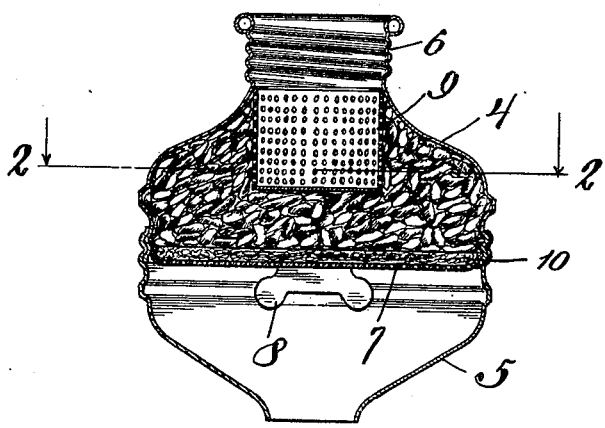
Figure 2:
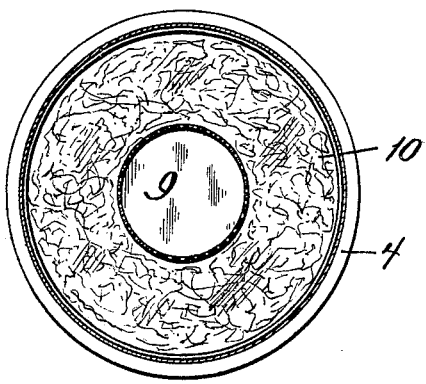
Figure 3:
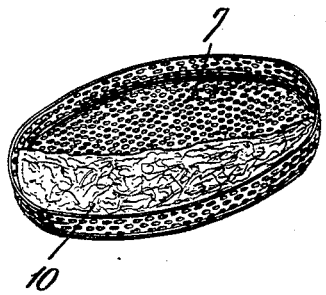

In the drawings, Figure 1 is a central vertical sectional view of a filter embodying my invention. Fig. 2 is a horizontal sectional view taken on the plane of the line 2 2 of Fig. 1. Fig. 3 is a perspective view of a preferred form of perforated diaphragm employed and felt washer supported thereby.

The filter comprises two separable sections, designated herein by the reference characters 4 5. The section 4, which for purposes of this specification is termed the "upper" section, has a substantially cylindrical lower portion which contracts gradually into an upper neck portion, preferably provided with screw-threads, as at 6, for the purpose of attaching it to a faucet. The lower body portion is also provided with screw-threads adapted to engage the upper portion of the lower section 5. In the structure herein shown the section 5 is exteriorly threaded upon the upper section 4.

A perforated diaphragm 7 is provided and is secured to the upper section 4. It is preferably so secured by interiorly screw-threading it therein, and a handpiece 8 is secured thereto for the purpose or adjusting and removing it.

A distributer 9 is mounted in the upper end of the section 4, and its upper end is open to receive the liquid to be filtered. The distributer is provided with perforated sides and an imperforate base, which base is arranged in the direction of the normal flow of the liquid. The space inclosed by the upper section 4, the distributer 9 arranged therein, and the diaphragm 7 is adapted to be substantially filled with a filtering material. The said filtering material may conveniently consist of a mixture of charcoal and quartz.

A felt washer 10 is provided and may be supported by the perforated diaphragm 7. The felt washer will prevent any of the finer particles of the charcoal and quartz from being discharged through the perforated plate, and, further, will tend to enhance or augment the filtering action.

When in operation, the liquid to be filtered will be forced through the sides of the distributer and delivered to the filtering material in a stream which has been broken up or subdivided rather than in a compact stream, as would be the case but for the provision of the imperforate distributer-base. The effect of this will be to prevent clogging of the filtering material and to effect a more perfect filtration of the liquid.

The lower section 5 has a reduced discharge-neck, and the subdivided stream of liquid will thereby be brought together again after having been filtered and will be discharged in a solid stream, as is desirable.

My construction also provides easy access to the parts for cleaning or for the renewal or cleansing of the filtering material. To obtain access to the filtering material, it is merely necessary to remove the filter from the faucet and then to remove the lower section 5 by unscrewing the same. The diaphragm 7 may then be removed by means of the handpiece 8, and the felt washer 10 may be removed therewith. The charcoal and quartz constituting the filtering material is now entirely exposed, but is retained in the section 4. It may be removed therefrom and cleansed or new material may be substituted. The cleansed or substituted material will merely be poured into the section 4, held inverted for the purpose until sufficient quantity has been introduced to substantially fill the said section, when the perforated diaphragm may be returned to its place. The section 5 being then adjusted the filter is again ready for use. My construction hence provides not only a very efficient filter, but also one which may be very easily cleansed or the filtering material thereof readily renewed.

What I claim as new, and desire to secure by United States Letters Patent, is—

A filter comprising two separable sections, one section exteriorly screw-threaded upon the other section, a perforated diaphragm screw-threaded into one of the sections at its point of union with the other section, the perforated diaphragm being provided with means whereby adjustment and removal may be effected, and filtering material arranged in that section which is nearer the liquid-inlet.

Signed at New York city, borough of Manhattan, in the county of New York and State of New York, this 24th day of December, A. D. 1900.

ALBERT L. BARON.

Witnesses:
G. W. BENTLEY,
P. D. L. CALDER.